(12) United States Patent
Fairy

(10) Patent No.: US 7,407,379 B2
(45) Date of Patent: Aug. 5, 2008

(54) INJECTION MOLDING NOZZLE

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 166 days.

(21) Appl. No.: 11/252,884

(22) Filed: Oct. 19, 2005

(65) Prior Publication Data

US 2006/0083813 A1    Apr. 20, 2006

Related U.S. Application Data

(60) Provisional application No. 60/619,685, filed on Oct. 19, 2004.

(51) Int. Cl.
*B29C 45/20* (2006.01)

(52) U.S. Cl. .................... 425/549; 264/328.15

(58) Field of Classification Search ................. 425/549; 264/328.15

See application file for complete search history.

(56) References Cited

U.S. PATENT DOCUMENTS

| | | |
|---|---|---|
| 4,768,283 A | 9/1988 | Gellert |
| 4,768,945 A | 9/1988 | Schmidt et al. |
| 5,492,467 A | 2/1996 | Hume et al. |
| 5,501,594 A | 3/1996 | Glozer et al. |
| 5,569,475 A * | 10/1996 | Adas et al. .................. 425/549 |
| 5,820,899 A | 10/1998 | Gellert et al. |
| 5,980,234 A | 11/1999 | Harley |
| 6,609,902 B1 | 8/2003 | Blais et al. |
| 6,666,675 B2 | 12/2003 | Ihara et al. |
| 6,726,467 B1 | 4/2004 | Lefebure |
| 2004/0265417 A1* | 12/2004 | Olaru ........................ 425/549 |

FOREIGN PATENT DOCUMENTS

| | | |
|---|---|---|
| DE | 19533231 | 3/1997 |
| DE | 19848508 | 4/2000 |
| EP | 0 492 296 B1 | 4/1995 |
| EP | 0 841 142 B1 | 3/2000 |
| EP | 0835176 | 5/2000 |
| FR | 2681813 | 4/1993 |
| JP | 56005746 | 1/1981 |
| JP | 2005319639 | 11/2005 |

* cited by examiner

*Primary Examiner*—Tim Heitbrink
(74) *Attorney, Agent, or Firm*—Medler Ferro PLLC

(57) ABSTRACT

An injection molding apparatus is disclosed that includes a manifold having at least one manifold melt channel therethrough, a mold plate defining a gate for transmitting melt flow to a mold cavity, and at least one nozzle including a nozzle body and nozzle tip defining a nozzle melt channel in communication with the manifold melt channel. The nozzle tip includes a substantially conical forward portion having a terminal end that is aligned with and spatially offset a predetermined distance "d" from the gate, the nozzle melt channel having a discharge opening that is located rearward of the terminal end for discharging melt flow from the nozzle melt channel towards the gate.

13 Claims, 4 Drawing Sheets

INJECTION MOLDING NOZZLE

CROSS-REFERENCE TO RELATED APPLICATIONS

This application claims the benefit of U.S. Provisional Application No. 60/619,685, filed Oct. 19, 2004, which is incorporated by reference herein in its entirety.

FIELD OF THE INVENTION

The present invention relates to an injection molding apparatus and a nozzle for an injection molding apparatus.

BACKGROUND OF THE INVENTION

A hot runner system is used to produce plastic parts from a mold; the hot runner delivers molten material to the mold cavity through a manifold, a nozzle, and a gate. A gate vestige mark is created on plastic parts from a hot runner system; this mark is created at the interface between the nozzle, gate and the mold cavity. In an application that requires a good esthetic appearance the size and shape of the gate vestige is important. There are many variables which can worsen the appearance of the gate vestige mark on a part, including stringing. Stringing occurs when the melt at the front of the nozzle tip and in the gate area is still relatively molten and therefore fluid or flowable when the part is ejected. The melt or molten plastic is drawn out in a line or string as the part is ejected. Stringing necessitates cleanup of the injection nozzle and tip causing downtime of the injection molding apparatus, which can be quite substantial for some applications. If the melt is sufficiently frozen at the front of the nozzle when the part is ejected, the plastic breaks or shears off, leaving behind a clean gate vestige mark on the finished plastic part.

Although the problems of stringing and gate vestige are common to many injection molding applications, these problems are a particular concern when using molding resins such as polypropylene, and when using faster cycle times. In such applications, the nozzle is generally operated at a higher temperature or does not allow for significant cooling times.

Thus, there is a need for an injection molding nozzle and tip which reduces or eliminates the problems associated with stringing and gate vestige.

SUMMARY OF THE INVENTION

Embodiments hereof are directed to an injection molding apparatus that includes a manifold having at least one manifold melt channel therethrough, a mold plate defining a gate for transmitting melt flow to a mold cavity, and at least one nozzle including a nozzle body and nozzle tip defining a nozzle melt channel in communication with the manifold melt channel. The nozzle tip includes a substantially conical forward portion having a terminal end that is aligned with and spatially offset a predetermined distance "d" from the gate, the nozzle melt channel having a discharge opening that is located rearward of the terminal end for discharging melt flow from the nozzle melt channel towards the gate. The nozzle further includes a thermally insulative tip retainer for securing the nozzle tip to the nozzle body. In an embodiment, the nozzle tip has a rounded terminal end.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described more fully with reference to the accompanying drawings in which like reference numerals indicate similar structure.

DETAILED DESCRIPTION OF THE INVENTION

Figure 1:
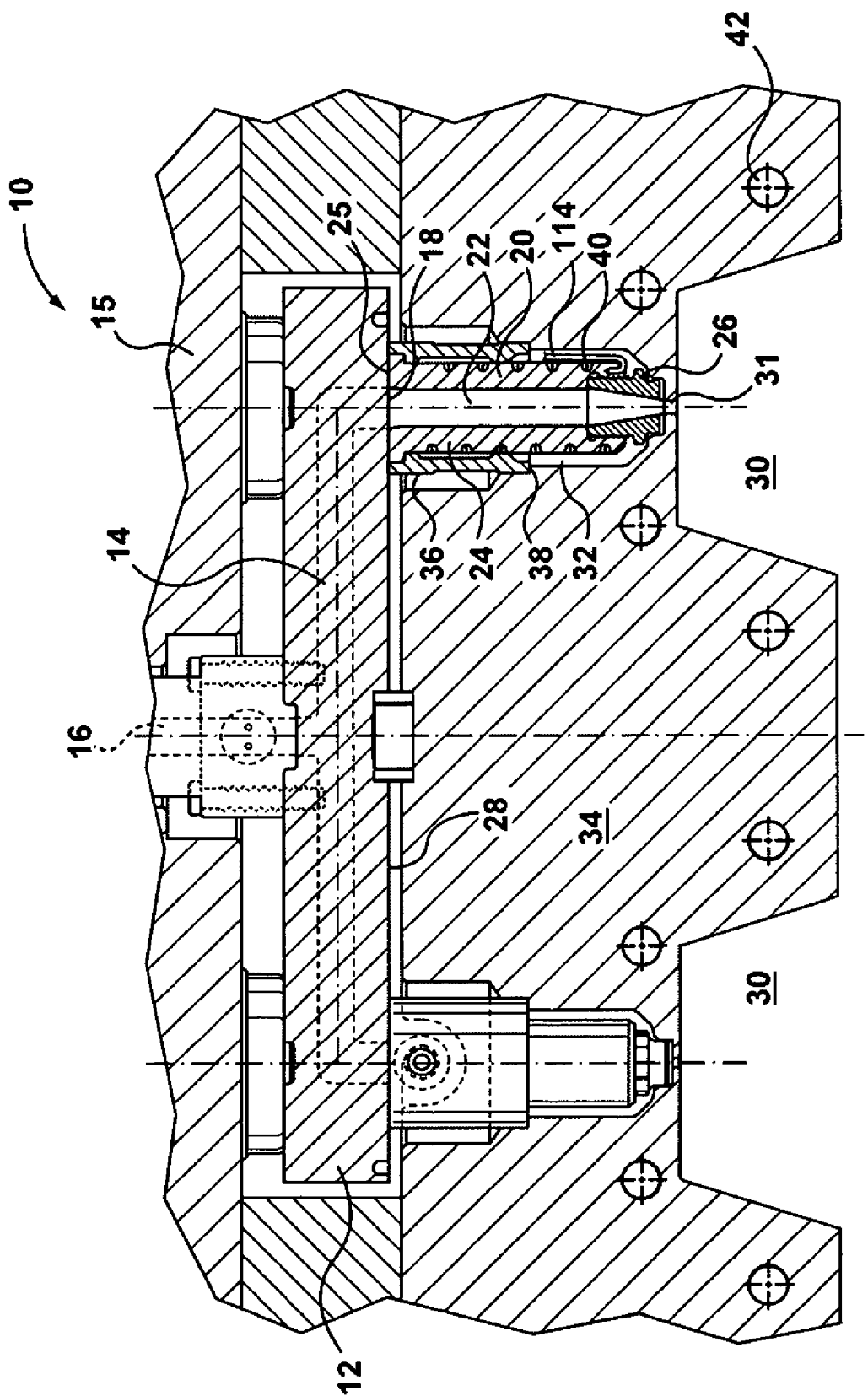
FIG. 1 is a sectional view of an injection molding apparatus in which embodiments of the present invention may be used, showing the right nozzle in cross-section.

Reference is first made to FIG. 1 which shows an injection molding apparatus indicated generally by reference numeral 10. The injection molding apparatus 10 is an example environment in which embodiments of the present invention may be used. The injection molding apparatus shown in FIG. 1 is provided for the purpose of illustrating the use of embodiments of the present invention and is not intended to be limiting. The injection molding apparatus 10 includes a manifold 12 having a manifold melt channel 14 extending therethrough. As shown in FIG. 1, the manifold 12 is fixed to a back plate 15 of the injection molding apparatus 10. However, a floating manifold may also be used to compensate for thermal expansion and contraction of adjacent components, if desired. An inlet 16 of manifold channel 14 receives a melt stream of moldable material from a machine nozzle (not shown). The melt stream flows through manifold channel 14 to outlets 18. Manifold heaters (not shown) are provided in manifold 12 to maintain the melt stream at a desired temperature.

Nozzles 20 are located between the manifold 12 and respective mold cavities 30. The nozzles 20 are received in wells or openings 32 provided in a cavity mold plate 34. Although a single mold plate 34 is shown, multiple mold plates or a modular mold plate assembly may also be used. Each nozzle 20 includes a nozzle head 24 and a nozzle tip 26. As shown in FIG. 1, the nozzle tip 26 is a one-piece tip; however, other types of nozzle tips may also be used such as a two-piece nozzle tip. An insulating ring or flange 36 surrounds the nozzle head 24 and abuts a seat or shoulder 38 of the mold plate 34. The flange 36 is provided to force an inlet surface 25 of the nozzle head 24 against an outlet surface 28 of the manifold 12 when the injection molding apparatus 10 is heated to an operating temperature. This provides a seal between the nozzles 20 and the manifold 12.

Each nozzle 20 includes a nozzle melt channel 22 for receiving the melt stream from the respective manifold outlet 18 and delivering the melt stream to the respective mold cavity 30 through respective mold gates 31. The mold gates 31 are provided at the entrance to the mold cavities 30, adjacent nozzle tips 26 of the nozzles 20. Each nozzle 20 is further provided with a heater 40, which helps to maintain the melt stream at a desired temperature as it passes through the nozzle 20. The nozzles 20 may also have a thermocouple 114. Cooling channels 42 are located adjacent the mold cavities 30 and transport a cooling fluid to cool and solidify the melt in the mold cavities 30.

In operation, a melt stream of moldable material is injected from a machine nozzle and flows through manifold melt channel 14, nozzle melt channel 22 and past mold gate 31 into mold cavity 30. The melt in mold cavity 30 is then cooled creating a molded part that is subsequently ejected from the injection molding apparatus 10.

Figure 2:
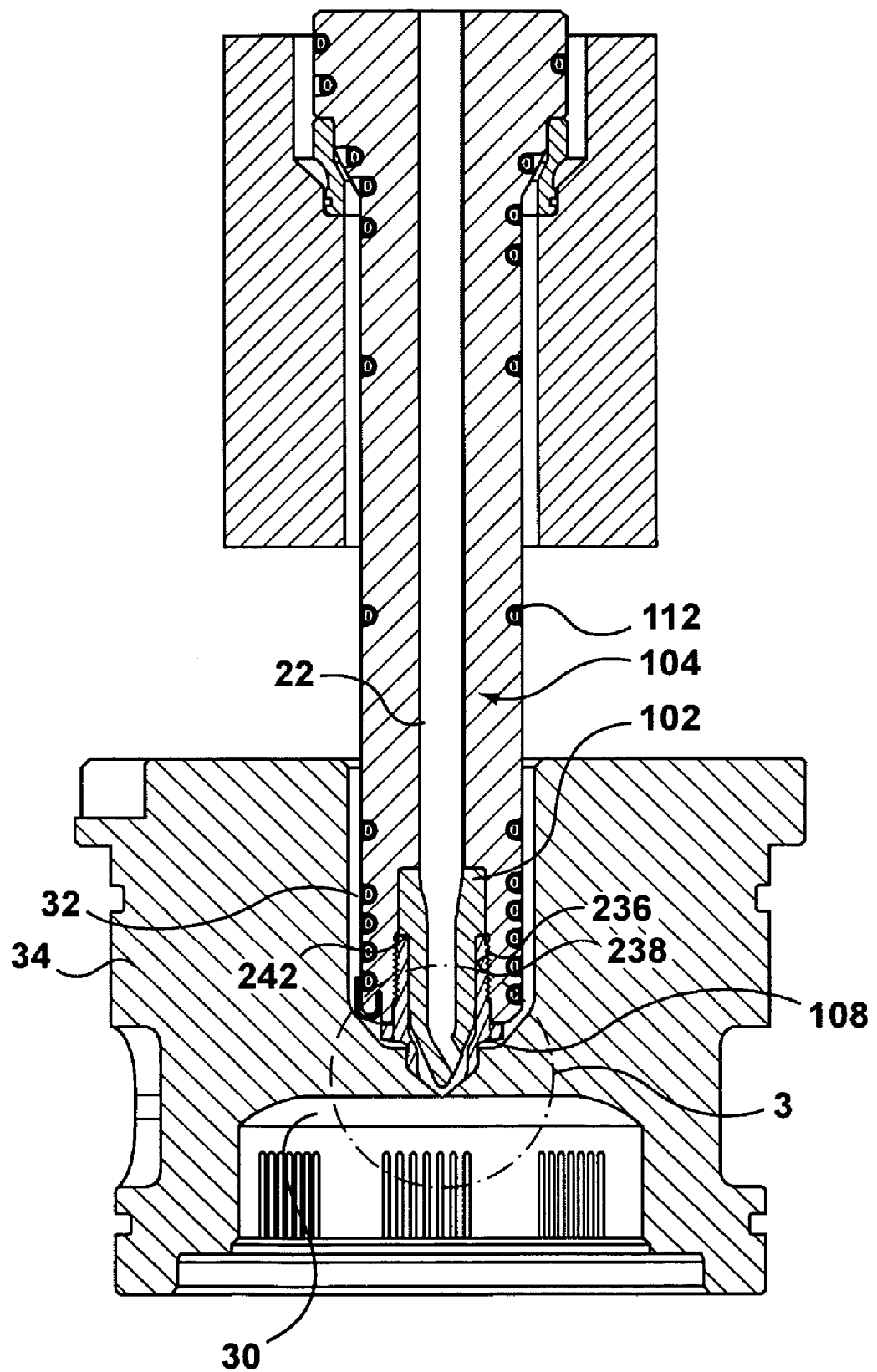
FIG. 2 is a cross-sectional view of an example embodiment of an injection molding nozzle.

FIG. 2 shows another example of a nozzle in which embodiments of the invention can be used. The nozzle of FIG. 2 is substantially the same as the nozzle discussed above in respect of FIG. 1, except that instead of having a one-piece nozzle tip/seal, the nozzle shown in FIG. 2 includes a nozzle tip 102 and tip retaining device 108 that together function as a two-piece nozzle tip/seal. Tip retainer 108 positions the nozzle tip 102 within a nozzle body 104 of the nozzle. In this embodiment, tip retainer 108 is threadingly engaged through threads 236 on an outer wall of tip retainer 108 with complementary threads 238 on an inner wall of nozzle body 104. When engaged, a shoulder 242 of tip retainer 108 abuts a corresponding portion of nozzle tip 102 to secure it to nozzle body 104.

Figure 3:
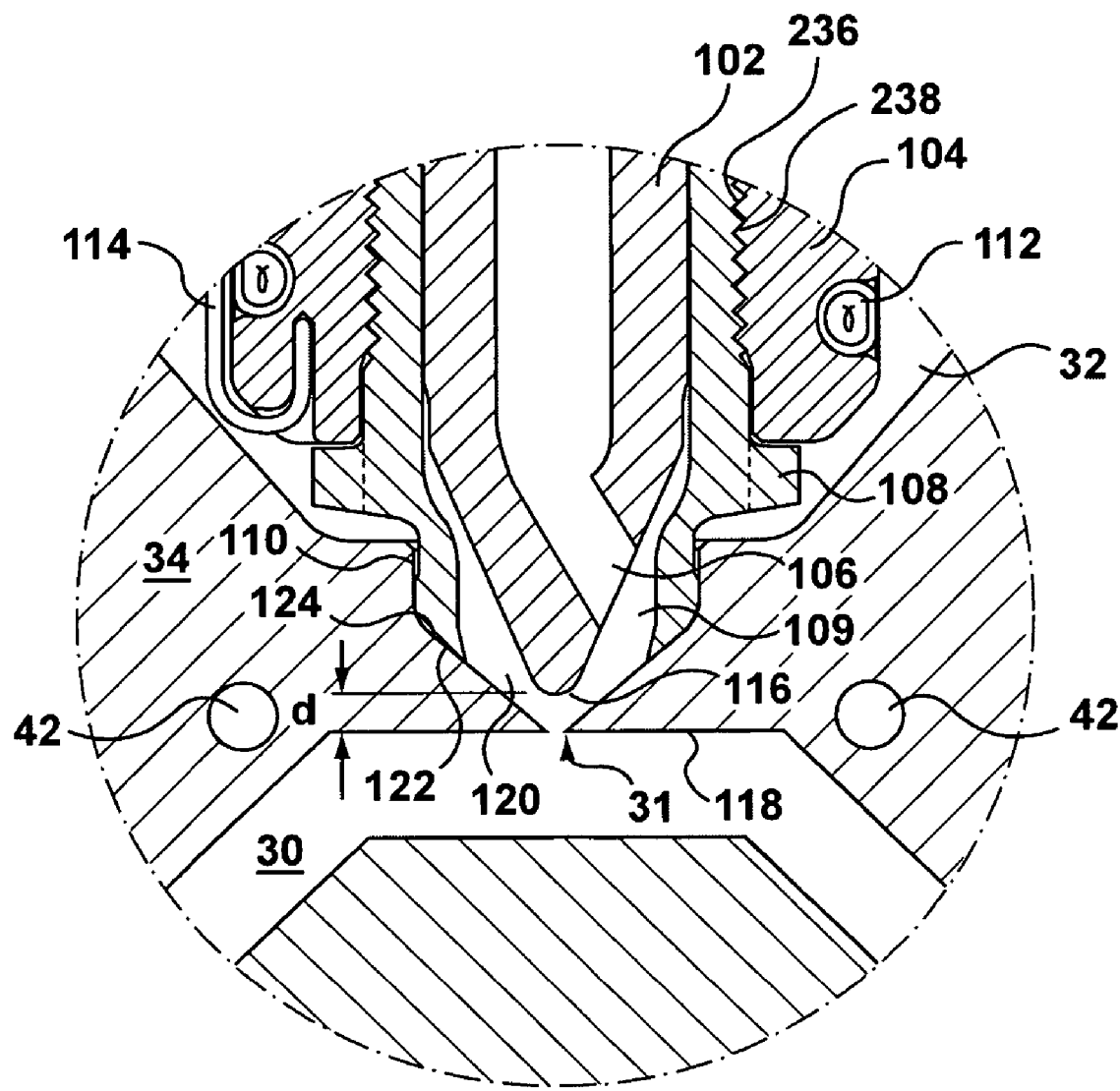
FIG. 3 is an expanded cross-sectional view of an end of the injection molding nozzle of FIG. 2, showing a first example embodiment of an injection molding nozzle tip.

FIG. 3 shows an enlarged portion of the nozzle of FIG. 2 having a nozzle tip constructed according to a first example embodiment of the present invention. The nozzle body 104 and a nozzle tip 102 define a nozzle melt channel 106 for receiving a melt stream from a corresponding nozzle melt channel 22 and delivering the melt stream to the respective mold cavity 30 through the respective mold gates 31. As shown in FIG. 3, the tip is generally conical at its downstream end and extends to close to the mold gate 31. The nozzle tip 102 is removably attached to the nozzle body 104 by tip retainer 108. The nozzle also includes a heating element 112 and a thermocouple 114. Although the nozzle tip 102 shown has a central melt channel 106 for the purposes of this invention it may also be of the torpedo type, which is well known in the industry (not shown) and provides an annular melt channel.

The tip retainer 108 is provided between nozzle tip 102 and the inner wall of the opening 32. The tip retainer 108 defines with tip 102 a tip retainer melt channel 109 in fluid communication with and downstream from the nozzle melt channel 106. The tip retainer 108 may also act as a seal and prevent backflow of melt from traveling further into opening 32 from nozzle tip 102 by providing an annular sealing portion 110 that contacts the mold plate 34 at an inner surface of the opening 32 within a melt chamber 120. Melt chamber 120 forms a portion of the opening 32 adjacent to mold gate 31. In the cold condition, a gap exists between the end surface 122 of the tip retainer 108 and surface 124 of the mold plate 34. This gap allows for heat expansion of the nozzle towards the gate 31 when the hot runner is brought up to operating temperature. In the heated condition, the end surface of the tip retainer 108 may abut a surface 124 of the mold plate 34, or in some instances a portion of the gap may remain to provide insulation between the tip retainer 108 and the mold plate 34. This is dependent on the requirements of the molding application.

The nozzle tip 102 may be formed from a tip material having a relatively high thermal conductivity to facilitate the conduction of heat from the heating element 112 to the melt in the tip retainer melt channel 109. Some examples of suitable materials for the tip 106 are Be—Cu (Beryllium-Copper), Beryllium-free Copper such as, for example, Ampco 940™, TZM (Titanium/Zirconium carbide), Aluminum or Aluminum-based alloys, Inconel™, Molybdenum or suitable Molybdenum alloys, H13, mold steel or AerMet 100™.

The nozzle tip 102 has a terminal end 116 which is rounded to provide a spatial offset of a predetermined distance "d" between the terminal end 116 and an end surface 118 of the mold plate 34. The mold gate 31 is provided in the end surface 118 adjacent the nozzle tip 102. The distance "d" between the terminal end 116 of the nozzle tip 102 and the mold gate 31 and the curvature of the terminal end 116 may vary based on the melt material, gate size, cooling conditions and cycle time, among other considerations. In some embodiments, the terminal end 116 is rounded to provide an offset of up to 1 mm.

The offset of the nozzle tip 102 from the mold gate 31 reduces the thermal mass for heat conduction in the gate area and creates a temperature gradient between the terminal end 116 and the mold gate 31. The temperature gradient allows some of the melt to cool and partially solidify within the opening 32 within or adjacent to the mold gate 31. The partially solidified melt forms a small plug or skin over the mold gate 31 that allows the molded part to be removed by a shearing separation, thereby reducing or eliminating stringing or interference from the melt. The skin or plug which forms can be readily re-melted on a subsequent injection cycle without clogging the nozzle or burning or thermally degrading the melt inside of the nozzle. Further, the rounded terminal end 116 does not create a significant problem of aerodynamic dead spots in front of the nozzle. In some example embodiments, the use of a rounded tip permits a greater relative thermal mass to be placed closer to the set-off distance "d" than would be possible using a similar nozzle with a non-rounded pointed nozzle tip that had the same set-off distance "d".

Figure 4:
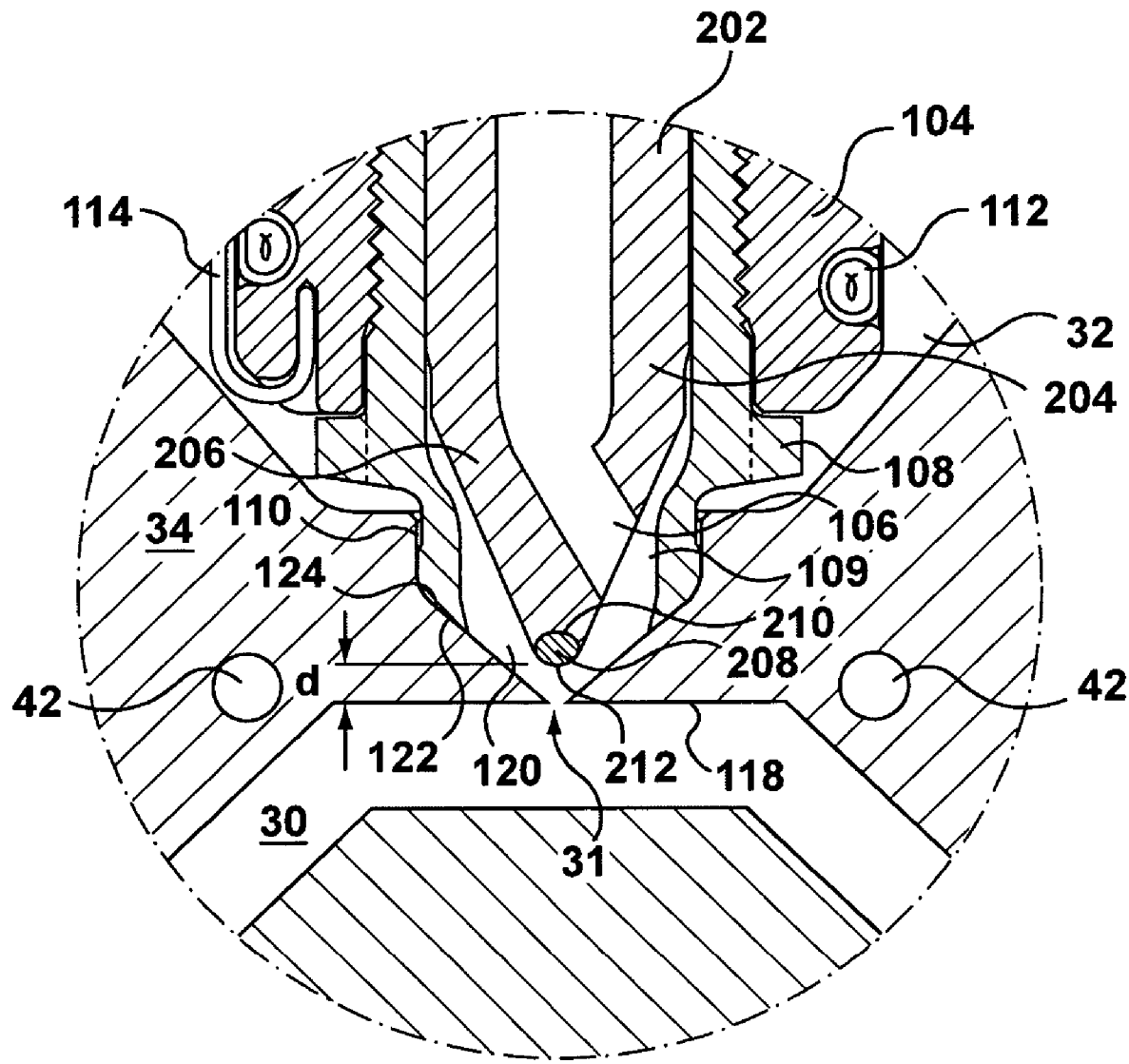
FIG. 4 is an expanded cross-sectional view of an end of the injection molding nozzle of FIG. 3, showing a second example embodiment of an injection molding nozzle tip.

FIG. 4 shows nozzle having a nozzle tip 202 constructed according to a second embodiment of the present invention. The nozzle differs from the nozzle shown in FIG. 3 in the construction of the nozzle tip, but is similar in other respects. The nozzle tip 202 has a tip body comprising a generally cylindrical body portion 204 and a generally conical portion 206. A bead 208 constructed of a relatively high wear resistant material is welded or brazed to the end portion 210 of the conical portion 206 of the nozzle tip 202. The nozzle tip 202 may be constructed by, for example, obtaining a nozzle tip with a cutoff end and welding, brazing or thermal bonding a bead of suitable wear resistant material thereto to form a rounded terminal end 212 of the nozzle tip 202.

A nozzle tip undergoes significant wear over its useful life, which may adversely affect processing conditions and require the nozzle tip to be replaced. One adverse effect that may occur as the nozzle tip wears is an increase in the size of the gate vestige created by the tip, resulting in unpredictable gate vestige over time. The use of a wear resistant material for the bead 208 may increase the wear resistance of the nozzle tip and thereby increase its useful life. Further, as wear resistant materials are typically poor heat conductors, the bead material can be selected to provide a nozzle tip having a terminal end with a relatively high wear resistance and relatively low thermal conductance compared with the remainder of the tip. In some example embodiments, the body portion 204 is constructed from Beryllium-Copper (Be—Cu) and the wear resistant bead 208 is constructed from a wear resistant ceramic, steel, or carbide material, for example, to form a bimetallic nozzle tip.

As for the nozzle tip 202, the terminal end 212 of the nozzle tip 202 is rounded such that it is spaced at a predetermined distance "d" from the end surface 118 of the mold plate 34. The distance "d" between the terminal end 206 of the nozzle tip 202 and the mold gate 31 may vary based on the melt material, gate size, cooling conditions and cycle time among other considerations. In some embodiments, the terminal end 206 is rounded to provide an offset of up to 1 mm.

It will be appreciated by a person skilled in the art that embodiments of the present invention could be utilized in systems utilizing multiple injection molding nozzles with a single mold cavity. Thus, according to at least one example embodiment is a nozzle tip for an injection molding nozzle to be installed in an injection molding apparatus, comprising a tip member having a front end and a rear end, and defining a melt channel between the front and rear end. The front end has a rounded terminal end. The nozzle tip may, in some embodiments include a tip body having an end portion and being formed from a first material, and a bead formed from a second material and attached to the end portion of the tip body such that it provides a rounded terminal end and the second material may in some embodiments have a wear resistance greater than a wear resistance of the first material and/or in some embodiments the second material may have a thermal conductivity less than a thermal conductivity of the first material. In some example embodiments, the first material is a beryllium-copper alloy, and the second material is titanium or a titanium alloy. In some example embodiments, the bead is attached to the end portion end using welding, brazing or thermal bonding. In some example embodiments, the nozzle tip body includes a body portion and a conical portion, the end portion of the tip body being disposed on the conical portion. In some example embodiments, the rounded terminal end is offset a distance of 0.05 to 1 millimeters from a mold gate.

The features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    a manifold having at least one manifold melt channel therethrough;
    a mold plate defining a gate for transmitting a melt flow to a mold cavity;
    at least one nozzle comprising
        a nozzle body having a nozzle melt channel in communication with the manifold melt channel,
        a nozzle tip including a substantially conical forward portion having a terminal end that is aligned with and spatially offset a predetermined distance "d" from the gate under operating conditions, the nozzle tip defining a central melt channel having a diverted melt channel end portion with a discharge opening that is located rearward of the terminal end for discharging the melt flow received from the nozzle melt channel towards the gate, and
        a thermally insulative tip retainer for securing the nozzle tip to the nozzle body, wherein the tip retainer includes an annular sealing surface that contacts the mold plate,
    wherein the predetermined distance "d" that the terminal end of the nozzle tip is set back from the gate creates a temperature gradient in the melt flow that permits the formation of a melt plug at the gate at the completion of an injection cycle to thereby permit a shearing separation of a molded part from the melt plug when the molded part is ejected at the end of the injection cycle.

2. The injection molding apparatus of claim 1, wherein the terminal end of the nozzle tip is substantially rounded.

3. The injection molding apparatus of claim 2, wherein the rounded terminal end is formed from a different material than the remainder of the conical forward portion of the nozzle tip.

4. The injection molding apparatus of claim 2, wherein the rounded terminal end is formed from a material that has a higher wear resistance than a material that forms the remainder of the conical forward portion of the nozzle tip.

5. The injection molding apparatus of claim 2, wherein the rounded terminal end is formed from a material that has a lower thermal conductivity than a material that forms the remainder of the conical forward portion of the nozzle tip.

6. The injection molding apparatus of claim 2, wherein the rounded terminal end is formed from titanium or a titanium alloy and the remainder of the conical forward portion of the nozzle tip is formed from a beryllium copper alloy.

7. The injection molding apparatus of claim 3, wherein the rounded terminal end is attached to the remainder of the conical forward portion of the nozzle tip through a welded bond, a brazed bond or a thermal bond.

8. The injection molding apparatus of claim 1, wherein the predetermined distance "d" that the terminal end is spatially offset is between 0.05 to 1 millimeter from the mold gate.

9. The injection molding apparatus of claim 2, wherein the rounded terminal end is formed from a bead of material that is used to a forward end of the conical forward portion of the nozzle tip, the bead of material having a greater wear resistance than the remainder of the nozzle tip.

10. The injection molding apparatus of claim 2, wherein the nozzle tip is removably connected to the nozzle body by the tip retainer.

11. The injection molding apparatus of claim 1, wherein the gate, a region of the mold plate surrounding the gate, the tip retainer and the conical forward portion and the terminal end of the nozzle tip are respectively configured in conjunction with the spatial offset of the terminal end for providing the temperature gradient suitable to cause the melt flow in the gate region to at least partially solidify at the completion of the injection cycle, thereby permitting the shearing separation of the molded part when the molded part is ejected from the injection molding apparatus at the end of the injection cycle.

12. The injection molding apparatus of claim 4, wherein the wear resistant material is selected for a group consisting of ceramic, steel, and carbide materials.

13. The injection molding apparatus of claim 1, wherein the tip retainer defines an annular melt channel that receives the melt flow from the discharge opening of the nozzle tip.

* * * * *

UNITED STATES PATENT AND TRADEMARK OFFICE
CERTIFICATE OF CORRECTION

| | | |
|---|---|---|
| PATENT NO. | : 7,407,379 B2 | Page 1 of 1 |
| APPLICATION NO. | : 11/252884 | |
| DATED | : August 5, 2008 | |
| INVENTOR(S) | : Fabrice Fairy | |

It is certified that error appears in the above-identified patent and that said Letters Patent is hereby corrected as shown below:

In column 6, claim 9, line 35, replace "used" before "to" with -- fused --.

In column 6, claim 10, line 38, after "claim" replace "2" with -- 1 --.

Signed and Sealed this

Twenty-first Day of October, 2008

JON W. DUDAS
*Director of the United States Patent and Trademark Office*